(12) United States Patent
Shimizu

(10) Patent No.: US 12,204,633 B2
(45) Date of Patent: Jan. 21, 2025

(54) INFORMATION PROCESSING APPARATUS, VERIFICATION METHOD OF PROGRAM, COMPUTER READABLE MEDIUM AND IMAGE PROCESSING APPARATUS

(71) Applicant: CANON KABUSHIKI KAISHA, Tokyo (JP)

(72) Inventor: Shota Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 17/697,999

(22) Filed: Mar. 18, 2022

(65) Prior Publication Data
US 2022/0309145 A1   Sep. 29, 2022

(30) Foreign Application Priority Data
Mar. 23, 2021   (JP) ................. 2021-049149

(51) Int. Cl.
G06F 21/44   (2013.01)
G06F 21/51   (2013.01)
G06F 21/57   (2013.01)
H04L 9/32    (2006.01)

(52) U.S. Cl.
CPC ............ *G06F 21/44* (2013.01); *G06F 21/51* (2013.01); *G06F 21/57* (2013.01); *H04L 9/3247* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,571,993 B2 | 10/2013 | Kocher et al. | |
| 9,565,023 B2* | 2/2017 | Takahashi | H04L 9/006 |
| 11,055,413 B2 | 7/2021 | Shimizu | |
| 2005/0257063 A1* | 11/2005 | Hamano | G06F 21/57 713/176 |
| 2017/0099152 A1* | 4/2017 | Kojima | H04L 9/3263 |
| 2018/0019876 A1* | 1/2018 | Moss | H04L 9/0643 |
| 2018/0343118 A1* | 11/2018 | Funayama | H04L 9/14 |
| 2020/0082093 A1 | 3/2020 | Shimizu | |
| 2022/0014379 A1* | 1/2022 | Avanzi | G06F 21/57 |
| 2022/0327203 A1* | 10/2022 | Sasaki | G06F 21/12 |

FOREIGN PATENT DOCUMENTS

| | | |
|---|---|---|
| JP | 2011086313 A | 4/2011 |
| JP | 2019075000 A | 5/2019 |
| JP | 2021005338 A | 1/2021 |

OTHER PUBLICATIONS

Japanese Office Action dated Nov. 18, 2024 in counterpart Japanese Patent Appln. No. 2021-049149.

\* cited by examiner

*Primary Examiner* — Joseph P Hirl
*Assistant Examiner* — Hassan Saadoun
(74) *Attorney, Agent, or Firm* — Venable LLP

(57) ABSTRACT

An information processing apparatus is provided. The apparatus is configured to verify a native program stored in a first storage unit with reference to a correct value stored in advance in the first storage unit; and, when an additional program is stored in a second storage unit that is different from the first storage unit, storing a correct value corresponding to the additional program in the second storage unit. The information processing apparatus is further configured to verify the additional program with reference to the correct value stored in the second storage unit, in addition to verifying the native program stored in the first storage unit.

8 Claims, 9 Drawing Sheets

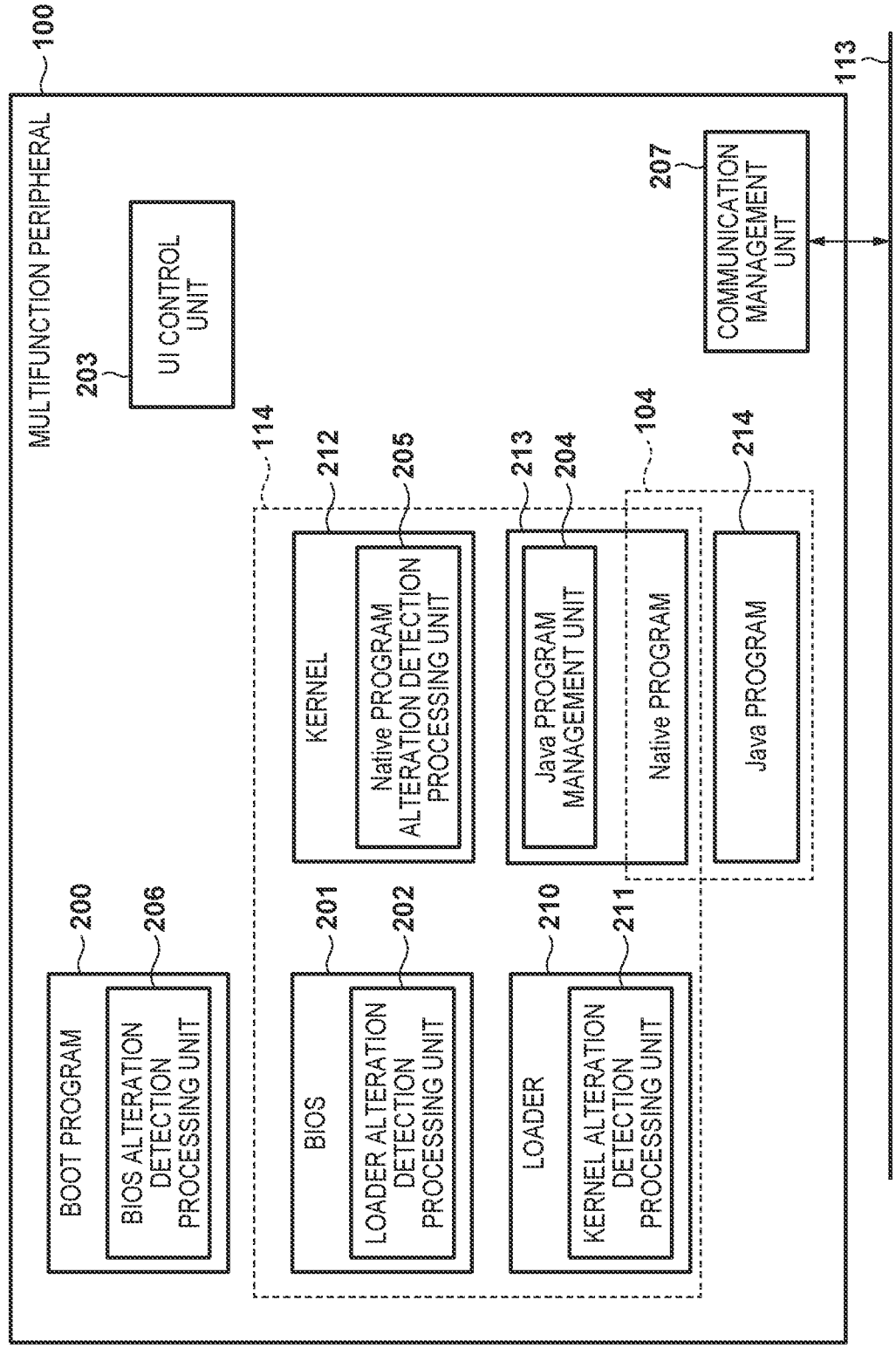

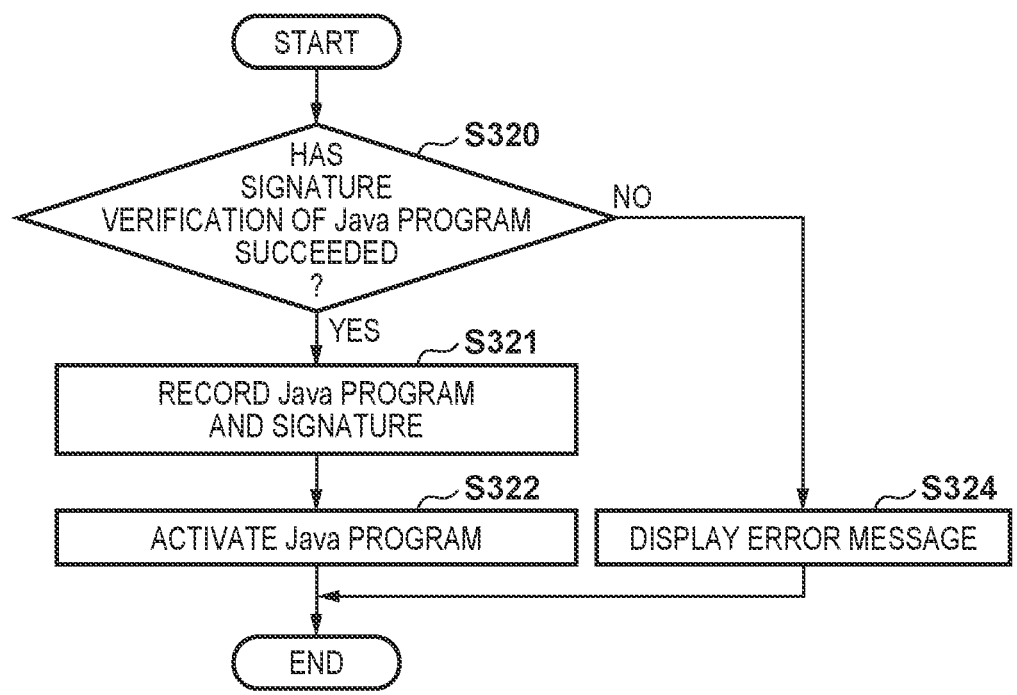

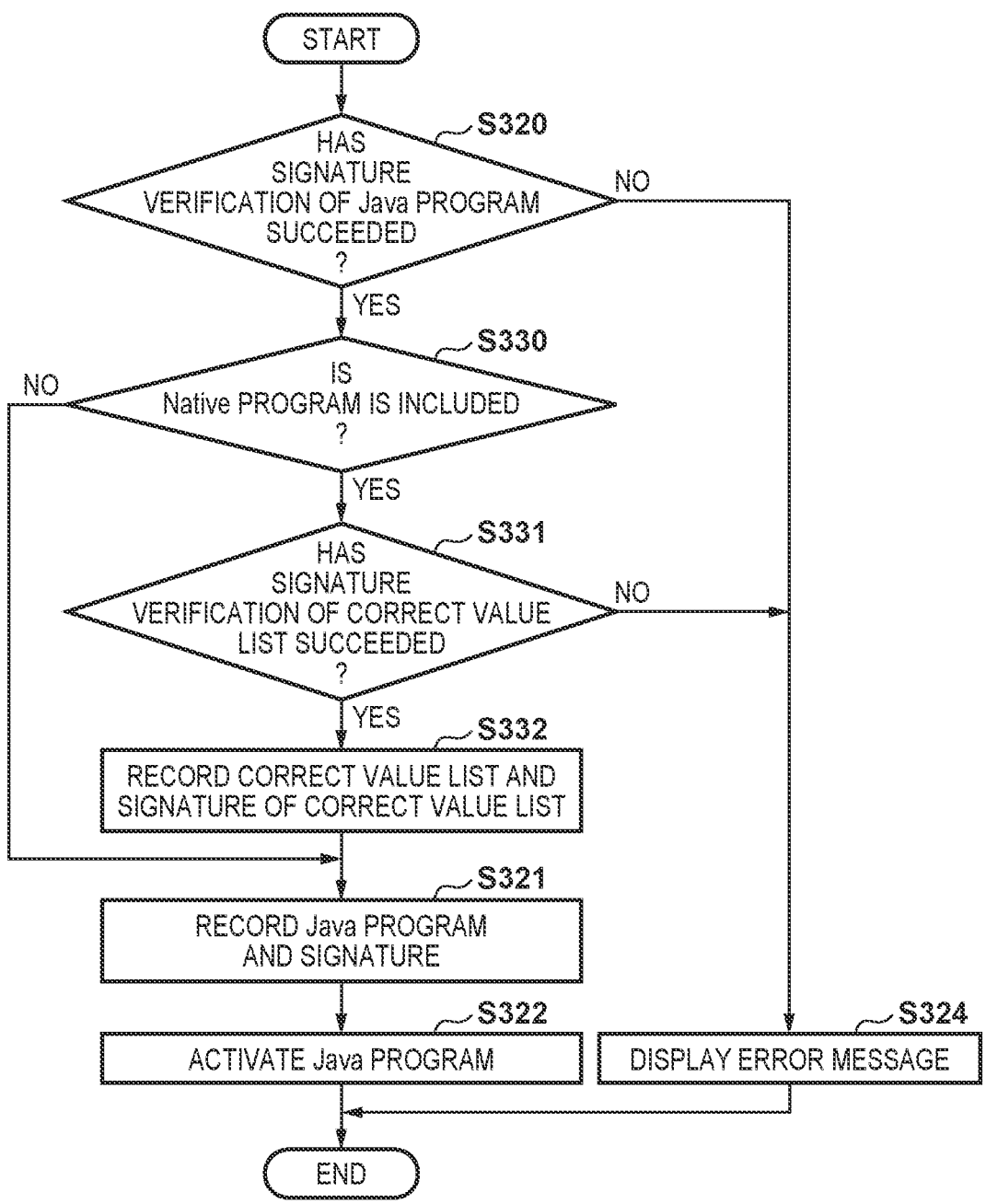

US 12,204,633 B2

INFORMATION PROCESSING APPARATUS, VERIFICATION METHOD OF PROGRAM, COMPUTER READABLE MEDIUM AND IMAGE PROCESSING APPARATUS

BACKGROUND OF THE INVENTION

Field of the Invention

The present invention relates to an information processing apparatus, a verification method of a program, a medium and an image processing apparatus.

Description of the Related Art

Attacks involving altering software to misuse computers by exploiting vulnerability of the software have become a problem. As a countermeasure against such attacks, it is known to perform alteration detection by saving in advance a hash value and a signature as correct values of a program. As a protection against storage alteration itself, a method is known that involves confirming that there is no alteration of an instruction attempting to access a storage, and, if confirmed, permitting the instruction to access the storage (e.g., Japanese Patent Laid-Open No. 2011-86313).

For an information processing apparatus that has a limited storage area and allows a program to be additionally installed therein later, it is difficult to store, in the apparatus, correct values for alteration detection of a later-installed program in advance. The method disclosed in Japanese Patent Laid-Open No. 2011-86313 cannot prevent an attack by which the storage area is altered in a power-off state, and there are cases that cannot be protected by the method.

SUMMARY OF THE INVENTION

The present invention is to perform alteration detection for a later-installed program even in an environment where it is difficult to store, in advance, correct values for alteration detection.

According to one aspect of the present invention, there is provided an information processing apparatus comprising one or more processors and one or more memories comprising one or more programs, wherein the one or more programs are configured to cause the one or more processors to: verify a native program stored in a first storage unit with reference to a correct value stored in advance in the first storage unit, and, when an additional program is stored in a second storage unit that is different from the first storage unit, store a correct value corresponding to the additional program in the second storage unit, wherein the one or more programs are configured to cause the one or more processors to: further verify the additional program with reference to the correct value stored in the second storage unit, in addition to verifying the native program stored in the first storage unit.

According to another aspect of the present invention, provide is an image processing apparatus comprising one or more processors and one or more memories comprising one or more programs, wherein the one or more programs are configured to cause the one or more processors to: verify a native program stored in a first storage unit with reference to a correct value stored in advance in the first storage unit, and, when an executional additional program stored in a second storage unit that is different from the first storage unit is executed, delete the executable additional program loaded in the second storage unit, and thereafter reload and execute the executional additional program.

According to the present invention, it is possible to perform alteration detection for a later-installed program even in an environment where it is difficult to store, in advance, correct values for alteration detection.

Further features of the present invention will become apparent from the following description of exemplary embodiments with reference to the attached drawings.

BRIEF DESCRIPTION OF THE DRAWINGS

FIG. 2 is a software configuration diagram of the multifunction peripheral.

FIG. 3A, FIG. 3B, FIG. 3C, FIG. 3D, FIG. 3E, and FIG. 3F are flowcharts illustrating processing executed by the multifunction peripheral when performing alteration detection during activation.

DESCRIPTION OF THE EMBODIMENTS

Figure 1:
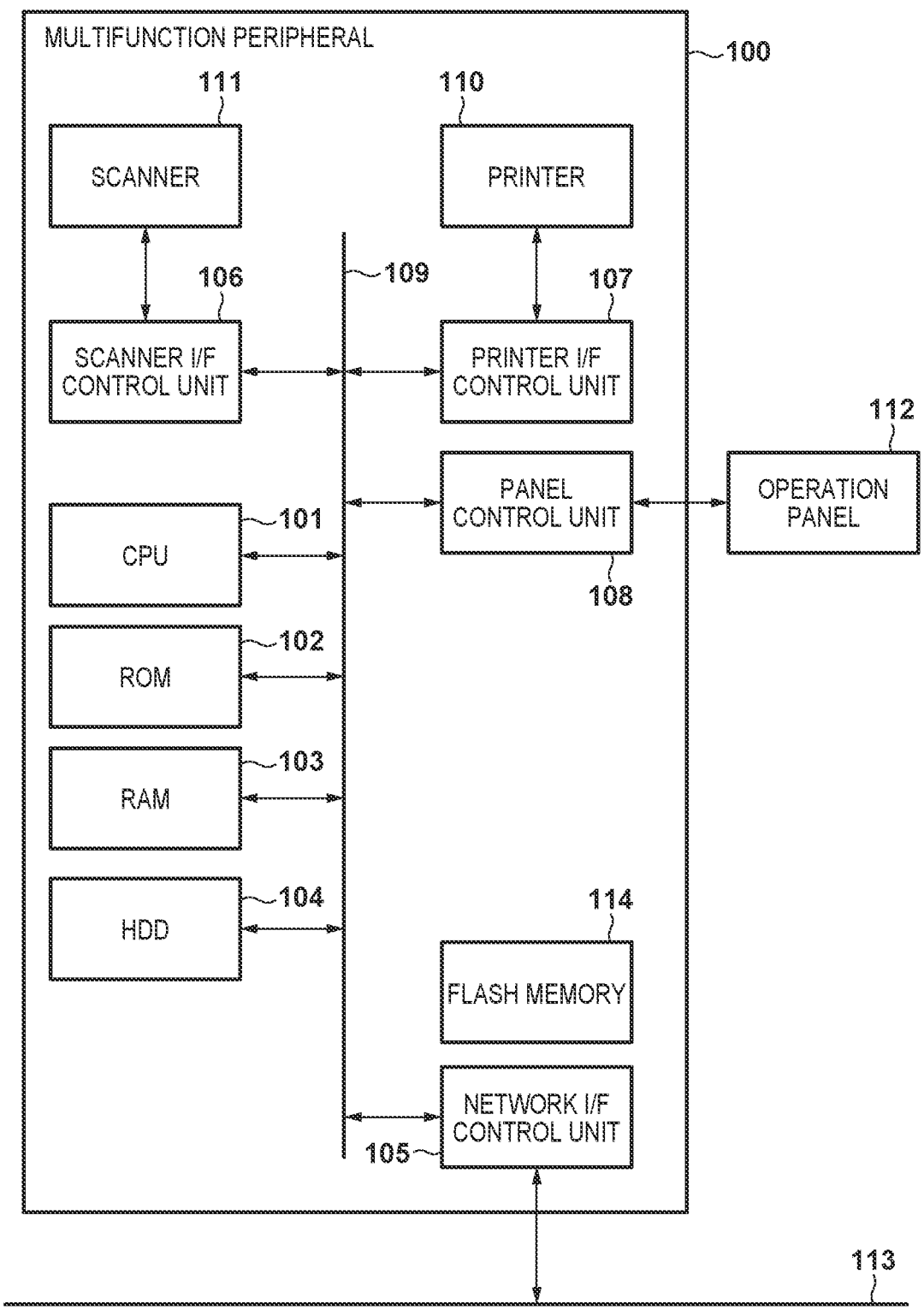
FIG. 1 is a hardware configuration diagram of a multifunction peripheral.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A multifunction peripheral (digital multifunction peripheral/MFP/Multi Function Peripheral) will be described as an example of an information processing apparatus according to an embodiment. However, the applicable range of the present invention is not limited to multifunction peripherals, and the invention can be applied to any information processing apparatus.

First Embodiment

Hardware

FIG. 1 is a block diagram illustrating a hardware configuration of a multifunction peripheral 100 according to the first embodiment.

A CPU (or also referred to as a processor) 101 executes a software program of the multifunction peripheral 100, and performs overall control of the apparatus. The CPU 101 is treated as a single processor in the present example, but may be formed by a plurality of processors. A ROM 102 is a read-only memory, and stores a boot program, fixed parameters, and the like of the multifunction peripheral 100. ARAM 103 is a random access memory, and is used, for example, for storing programs and transitory data when the CPU 101 controls the multifunction peripheral 100. An HDD 104 is a hard disk drive, and stores later-installed programs and various types of data. A flash memory 114 stores the minimum programs required for operations of the multifunction peripheral 10, including a BIOS, a loader, and a kernel. In addition, the flash memory 114 holds a correct value list and a signature of the correct value list that are used for alteration detection. The flash memory 114 may be connected via an interface such as a serial ATA (SATA), and may be fixed, but may be removable. In the flash memory 114, programs and data can be stored as files in a form equivalent to a hard disk, for example.

A network I/F control unit 105 controls data transmission/reception to/from a network 113. A scanner I/F control unit 106 controls reading of document performed by a scanner 111. A printer I/F control unit 107 controls printing processing and the like performed by a printer 110. A panel control unit 108 controls a touch panel-type operation panel 112, and controls display of various types of information, and input of instructions from the user. A bus 109 connects the CPU 101, the ROM 102, the RAM 103, the HDD 104, the network IF control unit 105, the scanner IF control unit 106, the printer I/F control unit 107, the panel control unit 108, and the flash memory 114 to each other. Control signals from the CPU 101 and data signals between apparatuses are transmitted and received via the bus 109.

Software

FIG. 2 is a block diagram illustrating software modules of the multifunction peripheral 100 according to the first embodiment. All of these software modules are processed by the CPU 101.

A communication management unit 207 controls the network I/F control device 105 connected to the network 113 to perform data transmission/reception to/from the outside via the network 113.

The UI control unit 203 receives input to the operation panel 112 via the panel control unit 108, and performs processing or outputs a screen to the operation panel 112 according to the input.

A boot program 200 is stored in the ROM 102, and is executed first by the CPU 101 when the multifunction peripheral 100 is turned on. During activation processing, the boot program 200 performs alteration detection of a BIOS 201 stored in the flash memory 114, using a BIOS alteration detection processing unit 206.

The BIOS 201 is a program executed after completion of the processing of the boot program 200, and is read from the flash memory 114 into the RAM 103 for execution. During activation processing, the BIOS 201 performs alteration detection of a loader 210 stored in the flash memory 114, using a loader alteration detection processing unit 202.

The loader 210 is a program executed after completion of the processing of the BIOS 201, and is read from the flash memory 114 into the RAM 103 for execution. During activation processing, the loader 210 performs alteration detection processing on a kernel 212 stored in the flash memory 114, using a kernel alteration detection processing unit 211.

The kernel 212 is a program executed after completion of the processing of the loader 210, and is read from the flash memory 114 into the RAM 103 for execution. The kernel 212 performs processing relating to activation, and also includes a native program alteration detection processing unit 205 that performs alteration detection of the native program 213. The native program alteration detection processing unit is also referred to as a program alteration detection processing unit.

The native program 213 is executed by the CPU 101, and includes a plurality of programs that provide functions of the multifunction peripheral 100. Examples thereof include programs for controlling the scanner IF control unit 106 and the printer IF control unit 106, and an activation program. The activation program is called from the native program by the kernel 212, and performs activation processing. The native program 213 may be stored in the flash memory 114, and be read into the RAM 103 for execution. Furthermore, the native program 213 may be provided via communication, and be added to the HDD 104, or in other words, be additionally installed. An additionally installed program is also referred to as an additional program. The function provided by the native program can be used from, for example, a Java (registered trademark, omitted hereinafter) program 214. The Java program management unit 204 is included as one of the native programs 213. However, in the present example, the Java program management unit 204 is installed in the flash memory 114 at the time of shipment, rather than being additionally installed. The native program is also referred to a native application. The native program (or the native application) is a program coded using native codes that can be executed in a specific environment including a processor and an operating system. Therefore, the native program 213 is executed in the multifunction peripheral 100, and incompatible to other environments.

The Java program 214 is executed by the CPU 101, and is added and used later by the user after shipment, and is stored in the HDD 104. The provision of the Java program 214 after shipment may be performed via communication, for example. The Java program may also be referred to as an application or a bundle, for example. To install the Java program 214, the Java program 214 needs to be authenticated using an installation license file. The license file includes a digital signature, for example. In that case, the license is authenticated by verifying the signature, whereby the Java program 214 can be installed.

The Java program management unit 204 is a program that uses a signature to confirms that a Java program is a legitimate program when the Java program is added later by the user, and records the Java program in the HDD 104 if confirmed. In addition, the Java program management unit 204 activates the Java program in response to an instruction from the activation program.

Processing Performed by Multifunction Peripheral During Activation

Figure 3A:
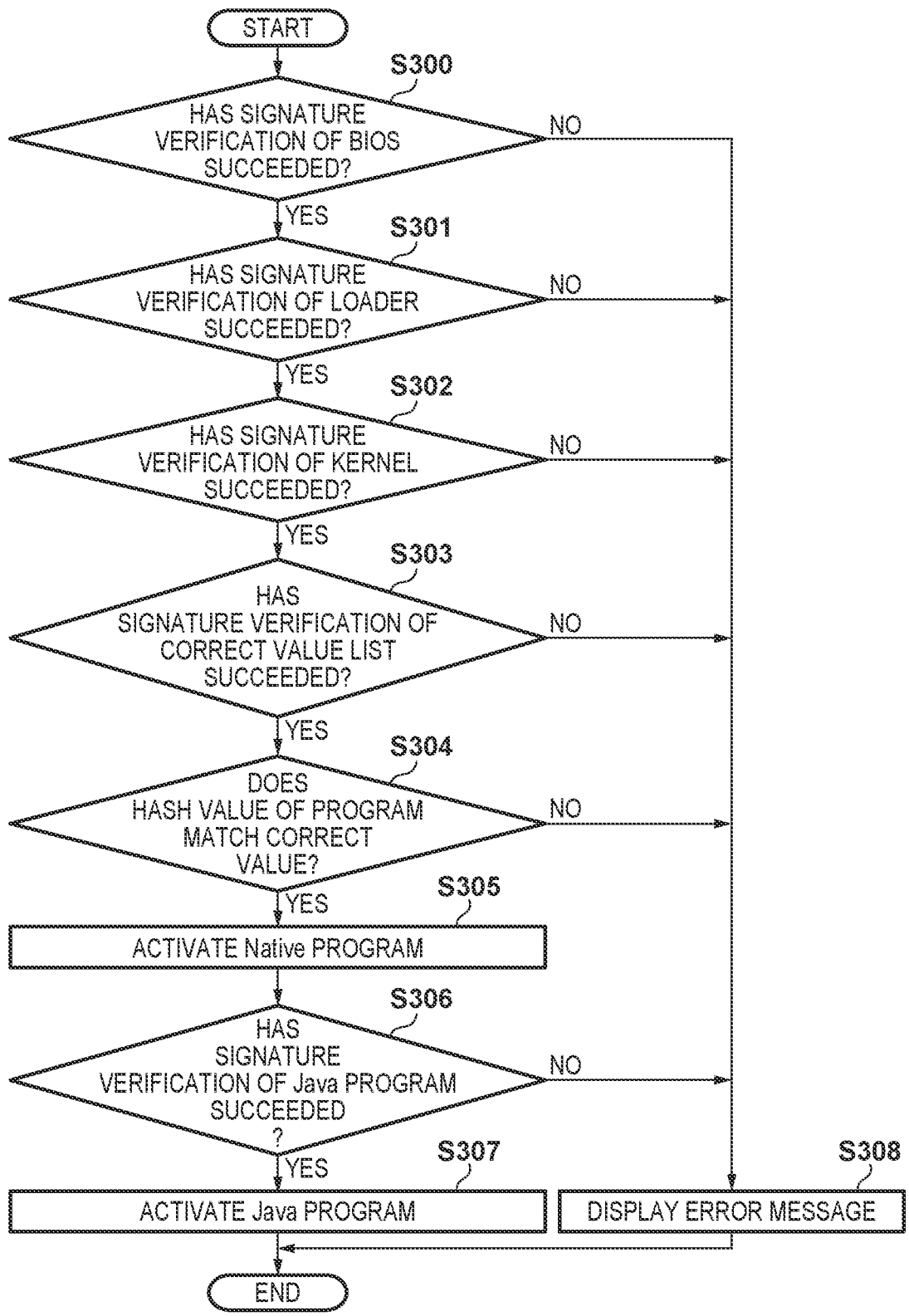

First, processing performed by the multifunction peripheral 100 when performing alteration detection during activation in the absence of a later-installed Java program 214 will be described with reference to the flowchart shown in FIG. 3A.

When the multifunction peripheral 100 is turned on, the boot program 200 stored in the ROM 102, and the BIOS 201, the loader 210 and the kernel 212 stored in the flash memory 114 are executed in order by the CPU 101.

When the multifunction peripheral 100 is turned on, the boot program 200 is executed from the ROM 102 by the CPU 101, which gives an instruction to the BIOS alteration detection processing unit 206 to perform alteration detection processing. Upon receiving the instruction, the BIOS alteration detection processing unit 206 uses the BIOS 201 and a signature for the BIOS 201 stored in the flash memory 114 to perform alteration detection processing on the BIOS 201 through signature authentication (S300). As a result, if the BIOS signature verification has failed, the boot program 200 displays an error message on the operation panel 112 (S308). If the signature verification has succeeded, the boot program 200 reads the BIOS 201 from the flash memory 114 into the RAM 103, and executes the BIOS 201.

Upon activation, the BIOS 201 performs various types of initialization processing, and thereafter given an instruction to the loader alteration detection processing unit 202 to perform alteration detection processing. Upon receiving the instruction, the loader alteration detection processing unit 202 performs signature verification, using the loader 210 and a signature for the loader 210 stored in the flash memory 114 (S301). As a result, if the signature verification has failed, the BIOS 201 displays an error message on the operation panel 112 (S308). If the signature verification has succeeded, the BIOS 201 reads the loader 210 from the flash memory 114 into the RAM 103, and executes the loader 210. Upon activation, the loader 210 performs various types of initialization processing, and thereafter gives an instruction to the kernel alteration detection processing unit 211 to perform alteration detection processing. Upon receiving the instruction, the kernel alteration detection processing unit 211 performs signature verification, using the kernel 212 and a signature of for the kernel stored in the flash memory 114 (S302). As a result, if the signature verification has failed, the loader 210 displays an error message on the operation panel 112 (S308). If the signature verification has succeeded, the loader 210 reads the kernel 212 from the flash memory 114 into the RAM 103, and executes the kernel 212.

The kernel 212 performs various types of initialization processing, and thereafter gives an instruction to the native program alteration detection processing unit 205 to perform alteration detection. Upon receiving the instruction, the native program alteration detection processing unit 205 performs signature verification of the correct value list stored in the flash memory 114 (S303). Table 1 is a schematic diagram of the correct value list. The correct value list is a list in which the location of each of the programs stored in the flash memory 114 and the hash value of the program are stored in association with each other. The correct value list and the signature are created by an external information processing apparatus, written into the flash memory 114 together with the corresponding program, and updated.

TABLE 1

| Locations of Programs | Hash values |
| --- | --- |
| /lib/aaa.so | e3b0c44298fc1c1 . . . |
| /lib/bbb.so | 1047ee5d71e7d8 . . . |
| /usr/bin/ccc.out | 73aeec9e373455 . . . |
| . . . | . . . |

As a result of the verification, if the signature verification of the correct value list has failed, the native program alteration detection processing unit 205, in S308, gives an instruction to the UI control unit 203 to display an error message on the operation panel 112.

If the signature verification of the correct value list has succeeded, the native program alteration detection processing unit 205 calculates, based on the information on the locations of the programs in the correct value list, the hash values of the relevant programs, for example, the programs stored in the flash memory 114. Here, the native program alteration detection processing unit 205 calculates the hash values for all of the programs included in the correct value list. The native program alteration detection processing unit 205 determines whether the calculated hash values match the respective corresponding hash values stored in the correct value list (S304), and if there is any mismatch, the native program alteration detection processing unit 205 performs the processing in S308. That is, an error message is displayed.

On the other hand, the hash values of all of the programs match the respective corresponding hash values in the correct value list, the native program alteration detection processing unit 205 notifies the kernel 212 of the success of the signature verification, and the kernel 212 activates the native program 213 (S305). Thus, the Java program management unit 204, which is one of the native programs 213, is also activated.

The activated Java program management unit 204 verifies each of the Java programs 214 stored in the HDD 104, using the signature stored in the HDD 104 (S306). If the verification has failed, the Java program management unit 204 instructs the UI control unit 106 to display an error message on the operation panel 112 (S308). On the other hand, if the verification has succeeded, or in other words, if the authentication of the installation license has succeeded, the Java program 214 for which the verification has succeeded is executed.

Conventional Verification of Later-Installed Java Program

Next, conventional processing performed in the multifunction peripheral 100 described above when adding a Java program 214 later will be described with reference to the flowchart shown in FIG. 3B.

Upon receiving an instruction to install a Java program is received from the user via the network 113, the Java program management unit 204 uses the received Java program and a signature to verify whether the Java program has been altered (S320). Here, the signature is used to determine whether or not the Java program is legitimate. The signature is given by the bender of the multifunction peripheral to a Java program that has passed a test (e.g., a test to determine whether or not the program is malicious) performed outside the multifunction peripheral 100. The signature corresponds to the above-described installation license.

If the Java program has been altered, the Java program management unit 204 instructs the UI control unit 203 to display an error message on the operation panel 112 (S324). If the Java program has not been altered, the Java program management unit 204 stores the Java program 214 and the signature used for the verification in step S320 in the HDD 104 (S321). Thereafter, the Java program management unit 204 executes the Java program 214 (S322). Here, a public key for verifying the signature given to the Java program is saved in advance in the HDD 104.

It is assumed that, in the multifunction peripheral 100 having such a configuration, a Java program that loads and stores a native program in the HDD 104 during activation, and executes the native program when the Java program is activated is installed as the Java program 214. In this case, each time the multifunction peripheral 100 is activated, the native program recorded in the flash memory 114 is subjected to alteration detection in S304. However, the native program recorded in the HDD 104 is executed without being subjected to alteration detection. This poses a problem that the multifunction peripheral 100 can be altered by altering the native program stored in the HDD 104.

Verification of Later-Installed Java Program in First Embodiment

Of the processing for solving this problem, first, installation processing of the Java program in the present embodiment will be described with reference to the flowchart shown in FIG. 3C. The processing operations in S320, S321, S322, and S324 are equivalent to those in FIG. 3B, and therefore the descriptions thereof have been omitted. In this method, when carrying out a test to determine whether or not to give a signature to the Java program, whether the native program is included as objects to be installed is determined. If it is determined that the native program is included, a correct value list of the native program to be installed and a signature of the correct value list are given to the Java program.

Figure 4A:
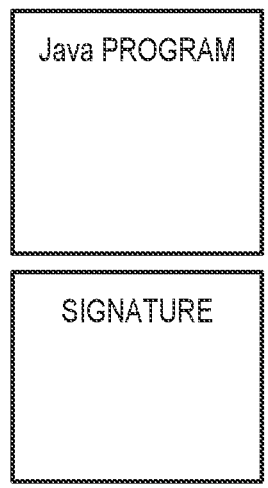
FIG. 4A is a schematic diagram showing a Java (registered trademark) program and a signature.
Figure 4B:
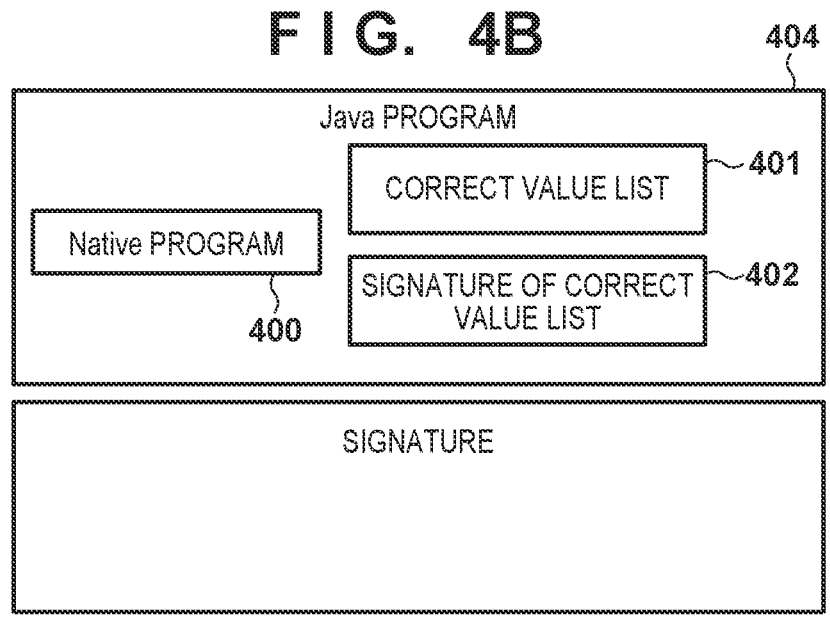
FIG. 4B is a schematic diagram showing a Java (registered trademark) program and a signature.

FIG. 4A is a schematic diagram showing a Java program that does not include a native program, and a signature. On the other hand, FIG. 4B is a schematic diagram showing a Java program 404 that includes a native program. It is shown that the Java program 404 is distributed in a state in which the Java program 404 includes a native program 400, a correct value list 401 corresponding to the native program 400, and a signature 402 of the correct value list 401. In either case, the signature is given to the Java program.

In FIG. 3C, the Java program management unit 204 performs signature verification of the Java program in S320. The object to be verified is the Java program 404. If the Java program 404 includes the native program 400, the correct value list 401, and the signature 402 of the correct value list 401, these are included in the object to be verified. If the signature verification has succeeded, whether a native program is included in the Java program to be installed is determined in S330. The presence or absence of a native program may be determined, for example, by including, in the Java program, information indicating the presence or absence of the native program, and testing the information. If a native program is not included, the processing in S321 is performed. The processing in this case is the same as that shown in FIG. 3B.

On the other hand, if a native program is included, the Java program management unit 204 performs, in S331, signature verification of the correct value list 401 included together with the native program 400. Here, a public key for verifying the signature 402 is saved in advance in the HDD 104. If the signature verification has succeeded, and it is determined that the correct value list 401 is correct, the Java program management unit 204 records (saves) the correct value list 401 and the signature 402 of the correct value list 401 in the HDD 104 in S332. Subsequently, the Java program management unit 204 performs the processing in S321, and records the Java program 404 and the signature thereof in the HDD 104.

Thereafter, during activation processing of the Java program in S322, the Java program 404 performs processing for retrieving the native program 400 included therein, and recording the native program 400 in the HDD 104 in an executable manner. Recording in an executable manner may include, for example, registering the native program 400 in an execution environment such as an OS so as to be scheduled in response to a call therefor. Recording in an executable manner may also be referred to as placing in an executable manner, or simply placing.

If the signature verification has failed in step S331, the Java program management unit 204 performs the processing in S324. In S324, a message corresponding to the error occurred is output.

Figure 3D:
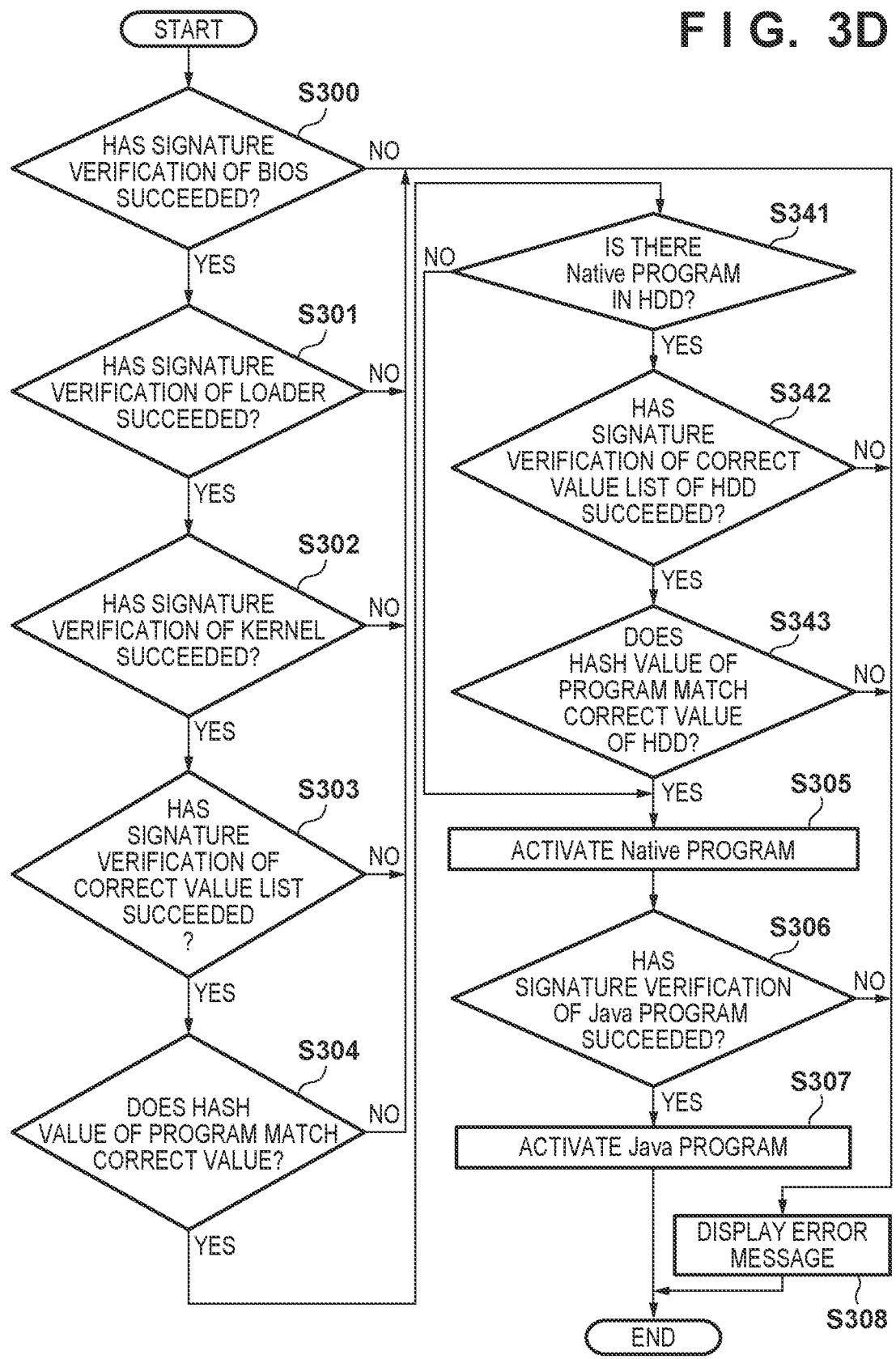

Processing Performed by Multifunction Peripheral According to the Present Embodiment During Activation Next, the activation processing of the multifunction peripheral 100 after the Java program 404 has been installed according to the procedure shown in FIG. 3C will be described with reference to FIG. 3D. FIG. 3D is also applicable to a case where the Java program 404 has not been installed, and encompasses the procedure shown in FIG. 3A. Note that the steps that are the same as those shown in FIG. 3A are denoted by the same reference numerals. The processing operations from S300 to S304 are the same as those shown in FIG. 3A, and therefore the descriptions thereof have been omitted.

If it is determined in step S304 that the hash value of the native program in the flash memory 114 matches the corresponding correct value, whether the native program has been installed in the HDD 104 is determined (S341). This determination may be performed, for example, based on the presence or absence of the correct value list, or the presence or absence of the correct value included in the correct value list. If it is determined that the native program has not been installed in the HDD 104, the procedure branches to step S305. If it is determined that the native program has been installed, the native program alteration detection processing unit 205 uses the correct value list 401 and the signature 402 on the HDD 104 to perform signature verification of the correct value list (S342).

If the signature verification has failed, the native program alteration detection processing unit 205 regards the native program as having been altered, and performs the processing in S308. Here, an error message regarding the error occurred is output. If the signature verification has succeeded, the native program alteration detection processing unit 205 calculates the hash value of the native program 400 stored in the HDD 104, based on the location of the program described in the correct value list 401. The native program alteration detection processing unit 205 determines whether the calculated hash value matches the value stored in the correct value list (S343), and if it does not, the native program alteration detection processing unit 205 regards the native program as having been altered, and performs the processing in S308. If the calculated hash value matches the value stored in the correct value list, the native program alteration detection processing unit 205 performs the processing operations in and after step S305. The processing operations are the same as those shown in FIG. 3A, and therefore the descriptions thereof have been omitted. Note that in the present embodiment, the native program in the flash memory 114 is activated in step S305, and the native program in the HDD 104 is not activated here. The native program in the HDD 104 is activated in response to the activation of the Java program that calls the native program.

As described thus far, according to the first embodiment, even in a case where a native program is installed together with a later-installed Java program, it is possible to thoroughly perform verification for these programs. This makes it possible to perform alteration detection even in a configuration in which a later-installed Java program includes a native program and executes the native program.

The present embodiment has been described assuming that the number of installed Java programs is one. However, when a plurality of Java programs are installed, it is possible to adopt a configuration in which the correct value list 401 and the signature 402 are saved for each program. In this case, it is also possible to adopt a configuration in which, if it is determined that some of the Java programs have been altered, only the altered Java programs are not activated.

For the determination performed in step S341, a correct value list 401 with no content and a signature 402 may be stored in advance in the HDD 104. In this case, if the correct value list 401 with no content and the signature 402 are present in the HDD, it may be determined that a native program has not been installed in the HDD.

Furthermore, it is possible to adopt a configuration in which, if the hash values do not match in S343, the Java program that is saved in the HDD 104 together with the relevant native program is deleted. During the activation processing of the Java program 404 in step S307, the processing for storing the native program, which is used by the Java program 404, saved in the HDD 104 in the HDD 104 in an executable manner is executed. Accordingly, if the Java program 404 is deleted, the native program that is suspected of being altered will not be executed. This allows the apparatus to operate in a state in which the program has not been altered.

Second Embodiment

In the method according to the first embodiment, the correct value list 401 and the signature 402 of the correct value list need to be given to the Java program 404 including the native program 400, outside the multifunction peripheral 100. This poses a problem that the multifunction peripheral 100 cannot complete the processing by itself.

Figure 3E:
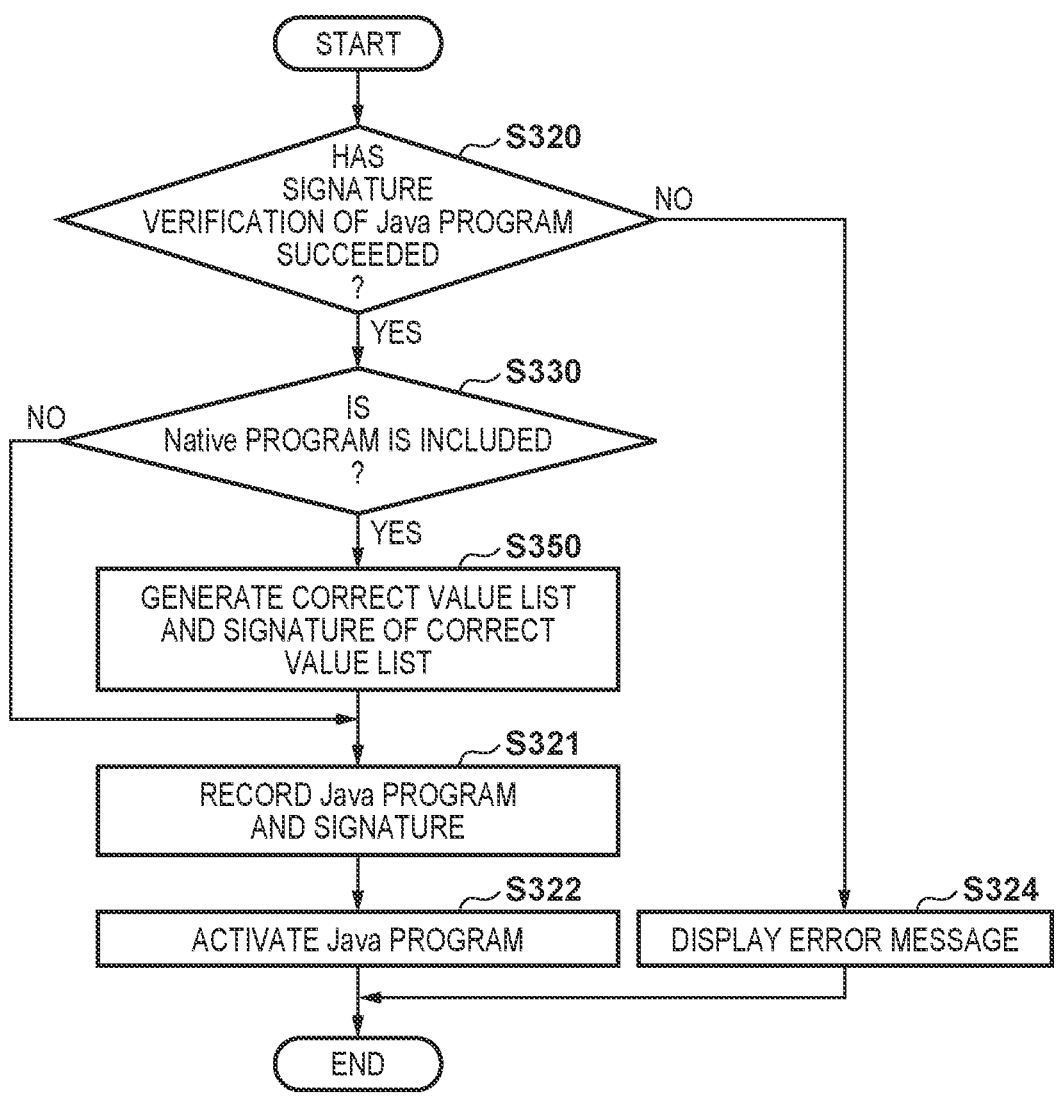

In the second embodiment, the multifunction peripheral 100 creates the correct value list 401 for the native program 400 included in the Java program 404 by itself, and gives the signature 402 of the correct value list by itself. This method will be described with reference to FIG. 3E. Note that the difference from FIG. 3C is that S331 is omitted, and S332 is replaced by S350, and therefore the descriptions of the other steps have been omitted.

If it is determined in S330 that a native program is included as objects to be installed, the Java program management unit 204, in S350, generates a correct value list corresponding to the native program that is to be installed, and stores the correct value list in the HDD 104. Next, the Java program management unit 204 generates a public key and a private key, uses the private key to generate a signature from the correct value list, and stores the public key and the signature in the HDD 104. A library for creating public keys and private keys is provided to the multifunction peripheral 100 in advance, and a public key and a private key can be created by supplying a suitable ID and a passphrase or the like as parameters.

The processing during activation of the multifunction peripheral 100 is the same as the processing shown in FIG. 3D of the first embodiment except that the processing in S342 is performed using the public key stored in the HDD 104 in S350.

Note that in the present example, even when a later-installed native program is included in a Java program, a correct value list of the native program, and a digital signature thereof are not included in the Java program. Therefore, the Java program that is subjected to signature verification also does not include a correct value list of the native program and a digital signature thereof.

As described thus far, according to the second embodiment, even in a configuration in which a later-installed Java program includes a native program and executes the native program, alteration detection of the native program can be performed. Additionally, unlike the first embodiment, the multifunction peripheral 100 can complete the processing by itself.

Third Embodiment

The methods according to the first and second embodiments require a correct value list and a signature of the correct value list to be newly stored in the HDD 104, and thus pose a problem that the methods cannot be implemented by an apparatus with a small storage area. Therefore, in the third embodiment, a method that does not use a correct value list and a signature of the correct value list will be described. The method for installing the Java program is the same as that shown in FIG. 3B, and therefore the description thereof has been omitted.

Figure 3F:
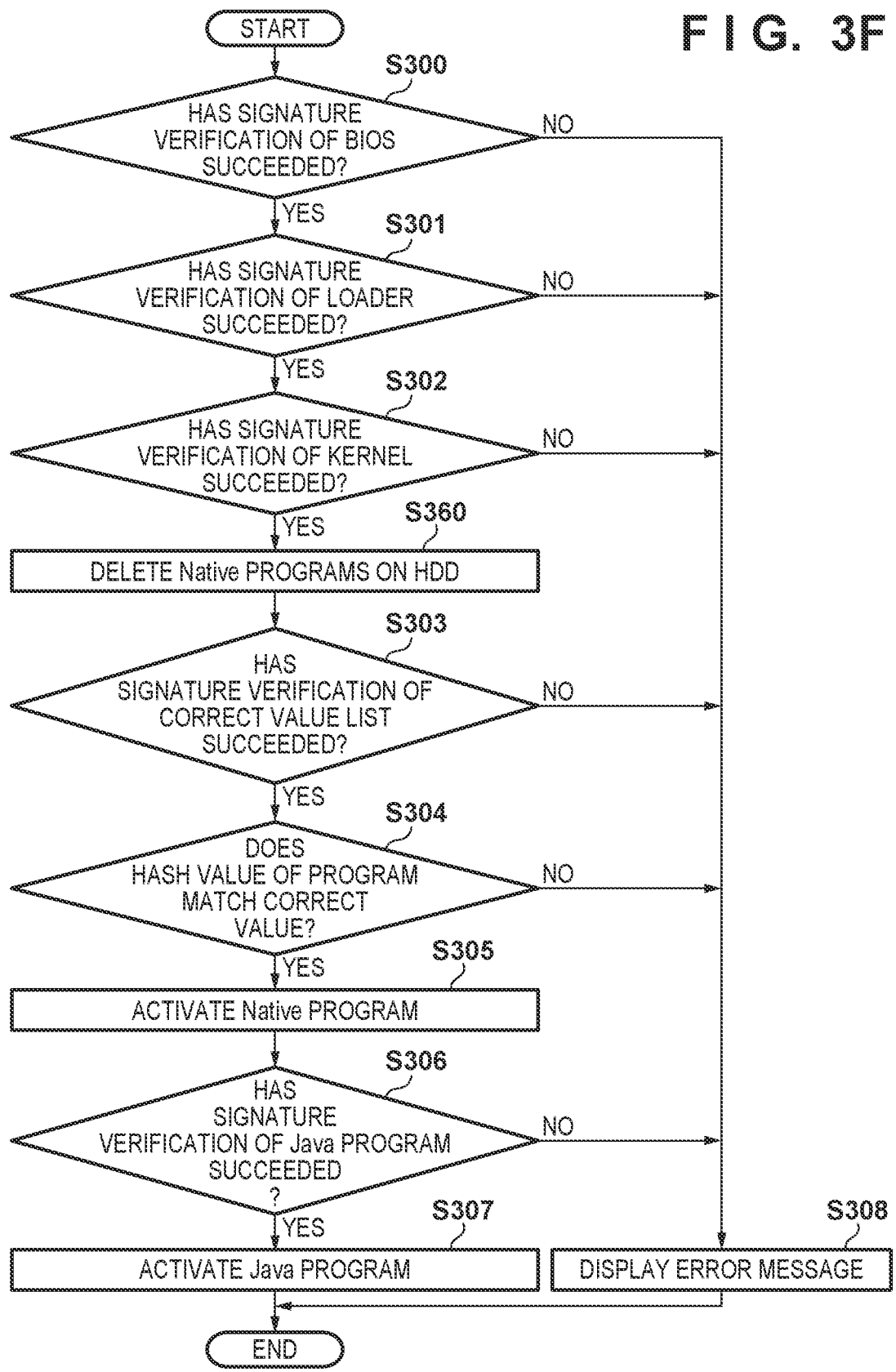

The processing performed during activation of the multifunction peripheral 100 will be described with reference to FIG. 3F. When the multifunction peripheral 100 is turned on, the BIOS stored in the ROM 102, and the loader and the kernel 212 stored in the flash memory 114 are subjected to signature verification in order by the CPU 101, and are executed if the signature verification has succeeded (S300 to S302). These steps are as described in relation to FIG. 3A.

The kernel 212 performs various types of initialization processing, and thereafter gives an instruction to the native program alteration detection processing unit 205 to perform alteration detection. Upon receiving the instruction, the native program alteration detection processing unit 205 deletes all native programs on the HDD 104 in S360. The processing operations thereafter are the same as those in steps S303 to S308 shown in FIG. 3A. In the activation processing of the Java program 404 in S307, the processing in which the native program included in the Java program and saved in the HDD 104 is stored in the HDD 104 in an executable manner is executed. Therefore, even if the native program stored in the HDD 104 in an executable manner has been altered, the apparatus can operate in a state in which the native program is unaltered, by rewriting the native program each time the Java program is activated.

As described thus far, according to the third embodiment, it is possible to perform alteration detection of a native program even in a configuration in which a later-installed Java program includes a native program, and the native program is also installed later. In addition, the storage area can be saved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-049149, filed Mar. 23, 2021 which is hereby incorporated by reference herein in its entirety.

What is claimed is:

1. An information processing apparatus comprising one or more processors and one or more memories comprising one or more programs, wherein the one or more programs are configured to cause the one or more processors to:
verify a native program stored in a first storage unit with reference to a correct value stored in advance in the first storage unit, and,
when an additional program is stored in a second storage unit that is different from the first storage unit, store a correct value corresponding to the additional program in the second storage unit, wherein
the one or more programs are configured to cause the one or more processors to: further verify the additional program with reference to the correct value stored in the second storage unit, in addition to verifying the native program stored in the first storage unit,
wherein the additional program and the correct value corresponding to the additional program are included in an application that uses the additional program, and are stored in the second storage unit together with the application,
wherein a digital signature corresponding to the application is further stored in the second storage unit together with the application,
wherein if the correct value is included in the application, a digital signature corresponding to the correct value is further included in the application, and,
when the application is stored in the second storage unit, the digital signature corresponding to the application and the digital signature corresponding to the correct value are verified.

2. The information processing apparatus according to claim 1,
wherein the verification of the additional program is performed when the additional program is executed.

3. The information processing apparatus according to claim 1,
wherein the correct value is a hash value of the additional program.

4. An information processing apparatus comprising one or more processors and one or more memories comprising one or more programs, wherein the one or more programs are configured to cause the one or more processors to:
verify a native program stored in a first storage unit with reference to a correct value stored in advance in the first storage unit, and,
when an additional program is stored in a second storage unit that is different from the first storage unit, store a correct value corresponding to the additional program in the second storage unit, wherein
the one or more programs are configured to cause the one or more processors to: further verify the additional program with reference to the correct value stored in the second storage unit, in addition to verifying the native program stored in the first storage unit,
generate a correct value corresponding to the additional program, wherein
the additional program is included in an application that uses the additional program, and the additional program and the correct value are stored in the second storage unit together with the application, and
wherein the one or more programs are configured to cause the one or more processors to:
generate a digital signature of the generated correct value, wherein
a digital signature corresponding to the application is further stored in the second storage unit together with the application, and,
when the application is stored in the second storage unit, the digital signature corresponding to the application and the digital signature corresponding to the correct value are verified.

5. The information processing apparatus according to claim 4,
wherein, also when the additional program is executed, the digital signature corresponding to the application and the digital signature corresponding to the correct value are further verified.

6. A non-transitory computer-readable medium storing a program, wherein the program is configured to cause a computer to:
verify a native program stored in a first storage unit with reference to a correct value stored in advance in the first storage unit, and,
when an executable additional program is stored in a second storage unit that is different from the first storage unit and is executed, delete the executable additional program loaded in the second storage unit and thereafter reload and execute the executable additional program.

7. A verification method of a program executed by an information processing apparatus, the method comprising:
verifying, by the information processing apparatus, a native program stored in a first storage unit with reference to a correct value stored in advance in the first storage unit; and,
when an executable additional program is stored in a second storage unit that is different from the first storage unit and is executed, delete the executable additional program loaded in the second storage unit, and thereafter reload and execute the executable additional program.

8. An image processing apparatus comprising one or more processors and one or more memories comprising one or more programs, wherein the one or more programs are configured to cause the one or more processors to:
verify a native program stored in a first storage unit with reference to a correct value stored in advance in the first storage unit, and
when an executable additional program stored in a second storage unit that is different from the first storage unit is executed, delete the executable additional program loaded in the second storage unit, and thereafter reload and execute the executional additional program.

* * * * *